Dec. 2, 1969 M. L. SASSLER 3,482,187

MULTIVIBRATOR CIRCUIT USING A COMMON TIMING CIRCUIT

Filed May 13, 1966 3 Sheets-Sheet 1

INVENTOR.
MARVIN L. SASSLER
BY
[signature]
ATTORNEY

MULTIVIBRATOR CIRCUIT USING A COMMON TIMING CIRCUIT

Filed May 13, 1966 3 Sheets-Sheet 2

INVENTOR.
MARVIN L. SASSLER
BY Percy P. Lantzy
ATTORNEY

INVENTOR.
MARVIN L. SASSLER
BY [signature]
ATTORNEY

United States Patent Office 3,482,187

Patented Dec. 2, 1969

3,482,187

MULTIVIBRATOR CIRCUIT USING A COMMON TIMING CIRCUIT

Marvin L. Sassler, Wayne, N.J., assignor to International Telephone and Telegraph Corporation, Nutley, N.J., a corporation of Maryland Filed May 13, 1966, Ser. No. 549,971
Int. Cl. H03b 5/14, 5/38, 5/42
U.S. Cl. 331—107 1 Claim

ABSTRACT OF THE DISCLOSURE

A multivibrator circuit powered by a DC voltage source wherein two four-layer diodes act as voltage-sensitive active elements, and a series RC timing circuit is common to both diodes, providing symmetrical output signals. A biasing capacitor is connected between each diode and one of the two load inputs, and after one diode fires initially, due to resistive biasing, the residual charge remaining on its associated capacitor back-biases said diode, insuring that the other diode will fire next. In another embodiment of the invention a constant current source is utilized in said common RC circuit, thereby increasing the frequency stability of the multivibrator. In a third, embodiment, which may be utilized with a bistable inverter circuit, said coupling capacitors are eliminated and the inverter circuit itself biases the diodes, insuring alternate firing.

This invention relates to multivibrators and more particularly to a multivibrator utilizing voltage sensitive switches having a common timing circuit.

The majority of prior art multivibrator circuits, even those employing voltage sensitive switches, use separate timing circuits for changing the state of each half of the multivibrator. This adds extra components to the circuit and makes it difficult to obtain a highly symmetrical waveform without having to adjust the timing elements. Also, the prior art circuits utilize one active element to change the state of the other active element. The disadvantage of this is that the power required for switching the states of the active elements could be more advantageously utilized as output power to a load.

Therefore, it is the main object of this invention to provide a multivibrator circuit wherein each active element has its state changed independent of the other active element and wherein a common timing circuit is utilized by both active elements, thereby providing highly symmetrical operation.

According to this invention a multivibrator circuit comprises a source of current, first and second voltage sensitive switches coupled to said source of current, a common timing circuit including one resistor and one capacitor coupled to said first and second switches and to said source of current, a first output means coupled to said first switch and a second output means coupled to said second switch.

The above mentioned and other objects of this invention will become more apparent by reference to the following description taken in conjunction with the accompanying drawings, in which.

Figure 1:
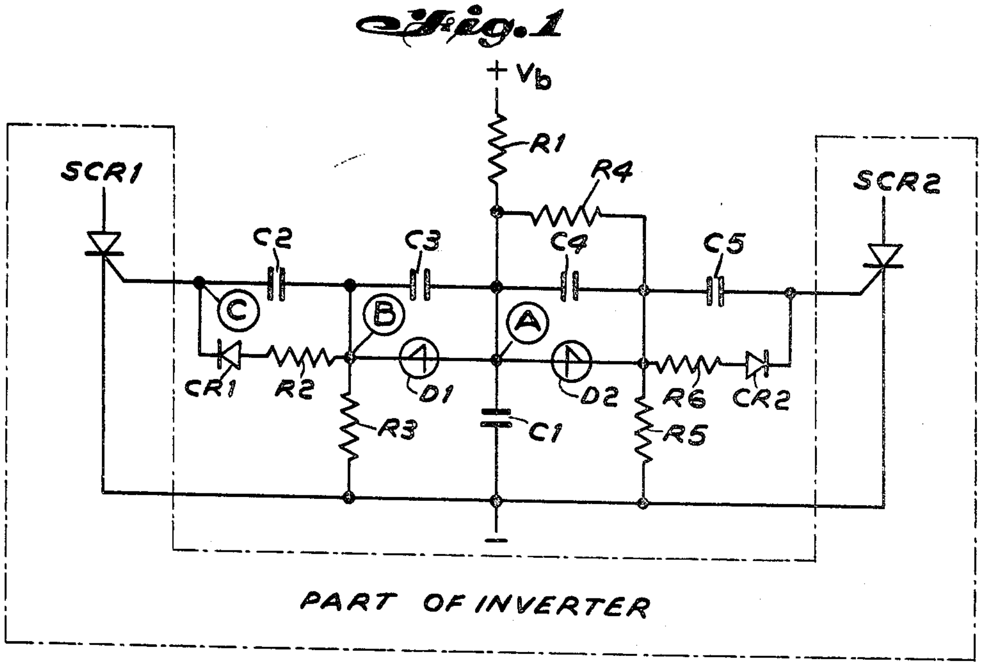
FIGURE 1 is a schematic diagram of a multivibrator circuit according to this invention.

Referring to FIGURE 1, there is illustrated a multivibrator according to this invention utilizing four layer diodes D1 and D2 as the voltage sensitive switches. It is clear that any other voltage sensitive switch may be used in place of four layer diodes. The characteristic of four layer diodes is that the impedance thereof is very large until the voltage thereacross reaches a critical firing potential, at which point the impedance thereof becomes very small and remains small until the diode current falls below a threshold or holding value. The diode impedance then becomes very large again.

In FIGURE 1, coupled between DC potential $V_b$ and the anodes of diodes D1 and D2 is charging resistor R1. Coupled between said anodes and ground is charging capacitor C1. R3 and R5 are coupled between the cathodes of diodes D1 and D2, respectively, and ground. Coupled across diodes D1 and D2 respectively, are capacitors C3 and C4. Further coupled to the cathode of diode D1 is the series combination of resistor R2 and diode CR1, which series combination is shunted by capacitor C2. Further coupled to the cathode of diode D2 is the series combination of resistor R6 and diode CR2, which series combination is shunted by capacitor C5. Coupled to the cathode diode of CR1 is the gate circuit of silicon controlled rectifier SCR1 and coupled to the cathode of diode CR2 is the gate circuit of silicon controlled rectifier SCR2. SCR1 and SCR2 comprise part of a bistable inverter circuit which is triggered by the circuit according to this invention. SCR inverter circuits are well known in the art and therefore the rest of the SCR circuit is not shown in the figures.

Operationally, it is assumed that both diodes D1 and D2 are initially in their high impedance state. When DC source $V_b$ is first applied to the circuit, capacitor C1 begins to charge up through resistor R1. It is assumed that the firing potentials of diodes D1 and D2 are slightly different in order that one turns on before the other. When capacitor C1 charges to the firing potential of diode D1 (assuming that diode D1 has the lower firing potential), the diode resistance becomes very small and the firing voltage is applied through resistor R2 and diode CR1 to the gate electrode of SCR1, thereby turning on SCR1. Capacitor C2 is also charged up when D1 fires. Capacitor C1 then discharges through diode D1 until the current therethrough drops below the holding value. The discharging time of diode D1, which is proportional to $(R2+RL1)$ (not shown)$\cdot(C1)$ is very much smaller than the charging time which is proportional to $R1\cdot C1$ (assuming that $R3>R2+RL1$). When the current through diode D1 falls below the holding value, diode D1 ceases to conduct. The charge remaining on capacitor C2 reverse biases diode D1, essentially raising the amount of voltage required at the anode of diode D1 to cause it to conduct again. Capacitor C1 again begins to charge towards supply voltage $V_b$. When the firing potential of diode D2 is reached D2 will fire since the cathode of diode D1 is positively biased by the charge on capacitor C2. When D2 fires, the firing voltage is applied to the gate electrode of SCR2, thereby turning SCR2 on. Capacitor C5 is also charged when diode D2 fires. When D2 fires a negative pulse is transmitted to the gate of SCR1, thereby inhibiting it from firing. Capacitor C1 then discharges through diode D2 in the same manner as previously described with respect to diode D1. During this interim, C2 discharges and C5 remains partially charged reverse biasing D2 and thereby allowing D1 to fire next. Therefore, it is seen that the above described circuit operates as a multivibrator, having a substantially symmetrical output waveform.

This circuit exhibits a high degree of immunity to stalling or locking up. This is primarily due to the common timing circuit comprising resistor R1 and capacitor C1, which cannot support the firing of more than one four layer diode at a time.

In the above description it was assumed that $V_b$ and R1, were dimensioned so that the holding current of D1 and D2 could not be reached, thereby making the circuit free-running (or astable). By proper dimensioning of $R_1$, $R_2$ and $R_3$ and/or $R_1$, $R_5$ and $R_6$ the circuit can be made bistable or monostable. If the resistor values are such that the steady state current through the four layer diodes exceeds their holding current, the circuit will be bistable. If only one set of resistors is adjusted so that the steady state current exceeds the holding current, then the circuit will be monostable.

Figure 3:
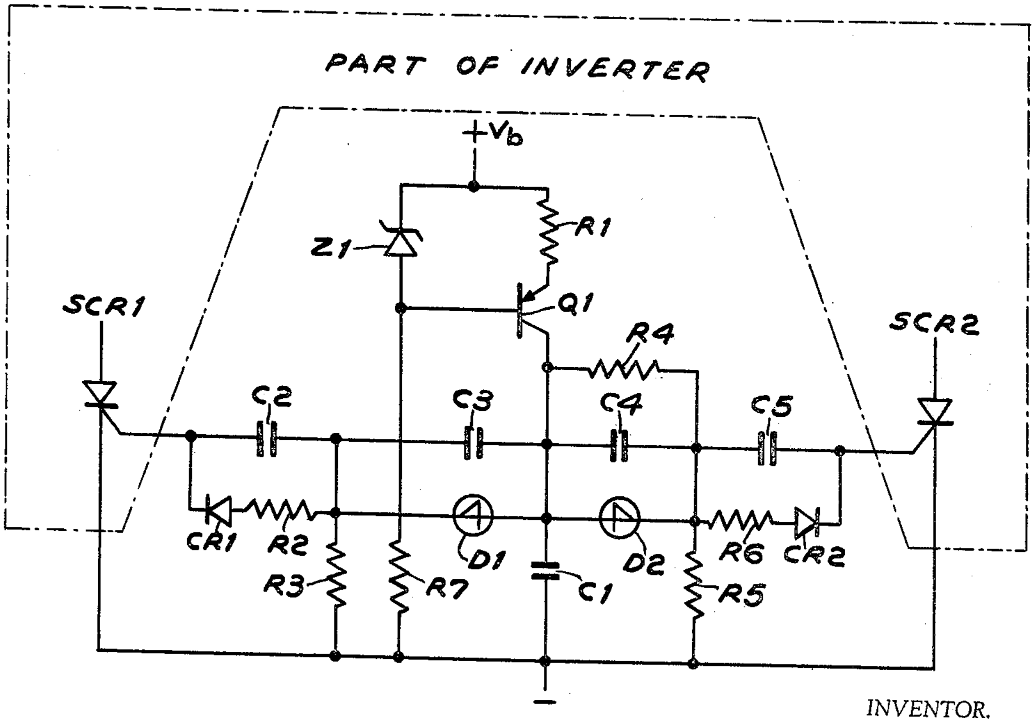
FIGURE 3 is a schematic diagram of a multivibrator utilizing a constant current source in place of a charging resistor.
Figure 2:
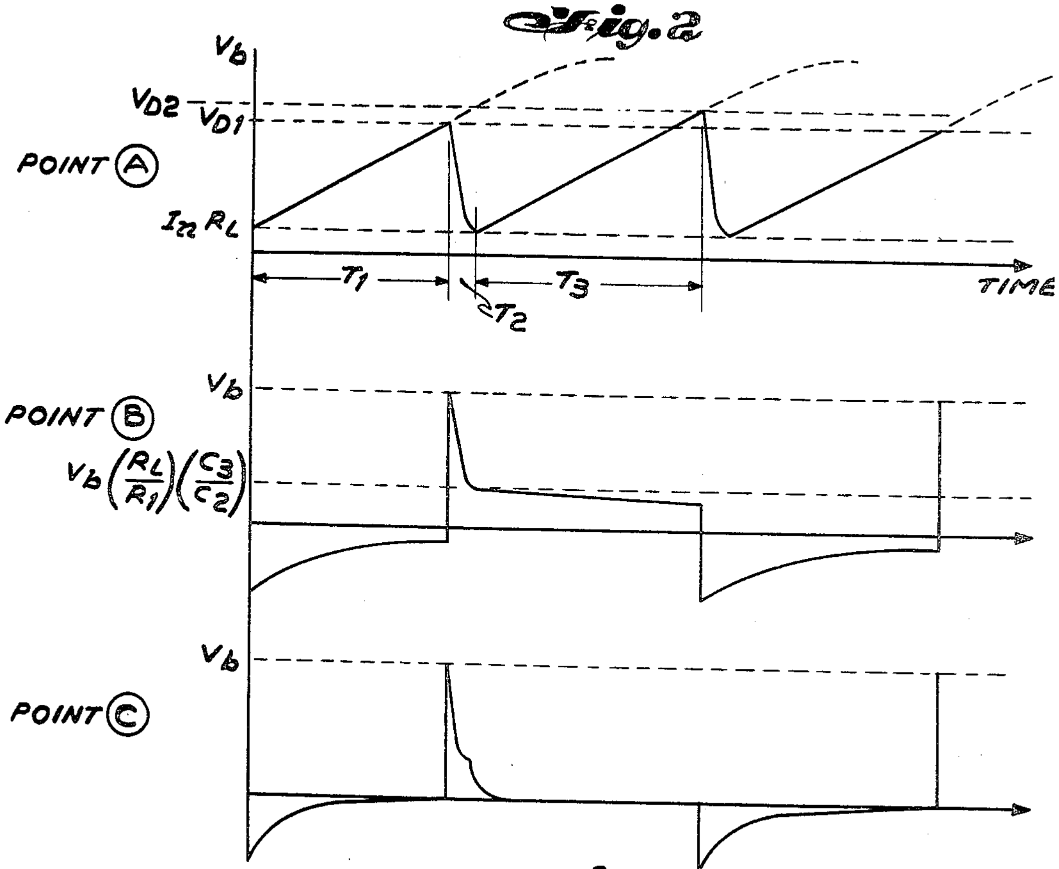
FIGURE 2 is an illustration of the waveforms appearing at the designated points in FIGURE 1.

The frequency stability of the circuit of FIGURE 1 may be improved by replacing resistor R1 with a constant current source as illustrated in FIGURE 3. This circuit operates in the same manner as the circuit above described. The use of a constant current source causes the voltage across the timing capacitor C1 to have a larger rate of change as it approaches the firing value of diodes D1 and D2. This leads to less uncertainty of the firing point, and therefore greater frequency stability.

In order to insure that one diode will always fire first, resistor R4 is coupled between the anode and cathode electrodes of diode D2 as shown in FIGURE 1. This is a standard method used in prior art multivibrators to insure that one-half thereof always begins the oscillations. In this case, diode D1 will fire first due to the addition of R4 coupled across diode D2.

Figure 4:
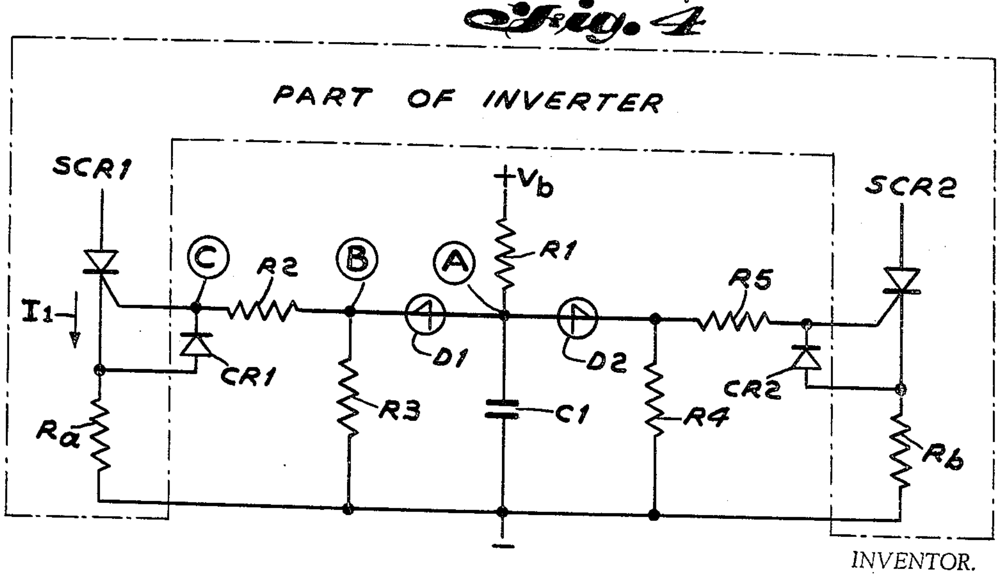
FIGURE 4 is a schematic diagram of a multivibrator according to the invention for use in DC-to-AC inverters.

The above-described circuits may be greatly simplified as shown in FIGURE 4 for D.C. to A.C. inverter applications by using the inverter circuit as the auxiliary memory for the multivibrator circuit. In such a case, the inverter circuit must be of the bistable type wherein the turning on of one side of the circuit causes the other side of the circuit to turn off. The inverter circuit may be of the silicon controlled rectifier type (as partially shown in FIGURE 4) or of the standard transistorized variety. The waveforms appearing at the designated points in FIGURE 4 are illustrated in FIGURE 5.

Figure 5:
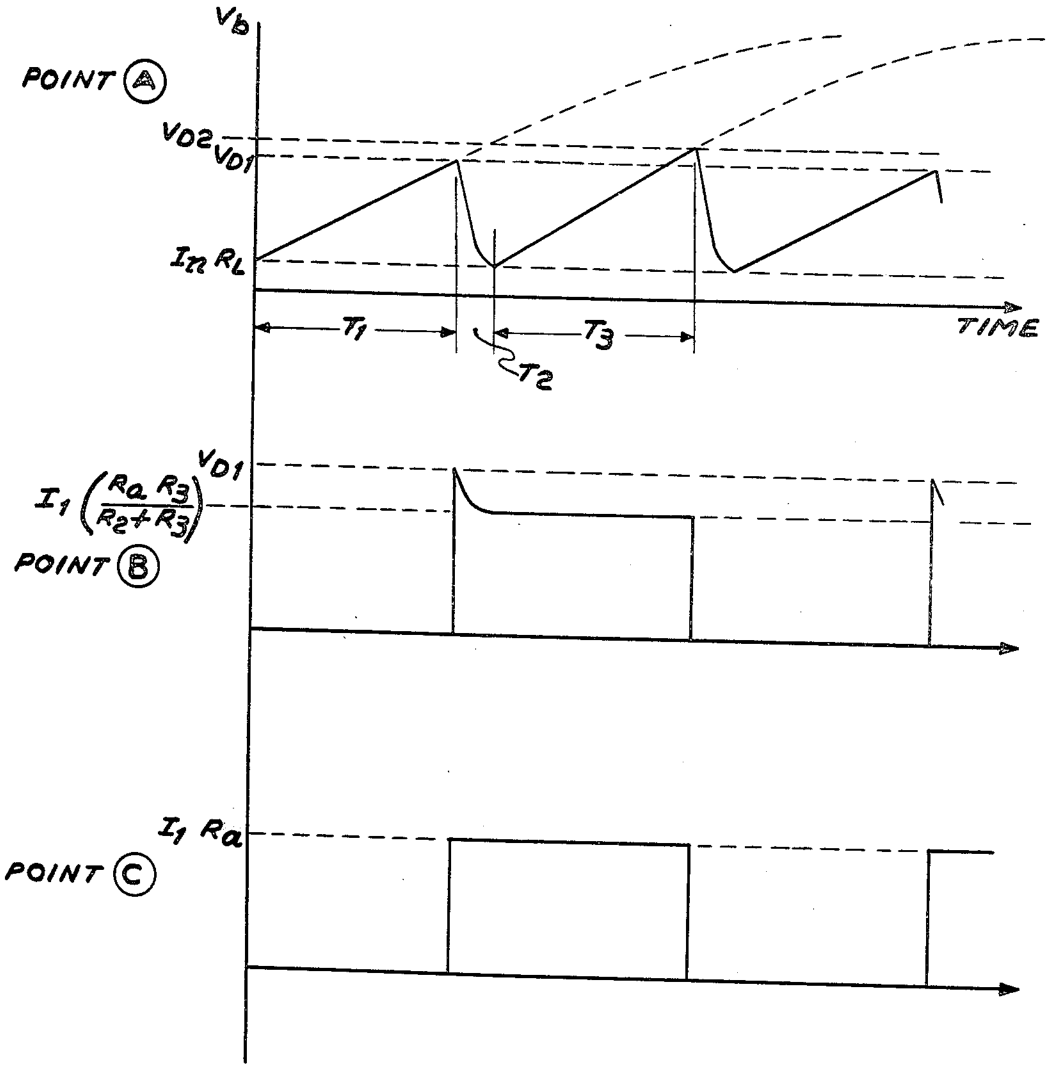
FIGURE 5 is an illustration of the waveforms appearing at the designated points in FIGURE 4.

Referring to FIGURES 4 and 5 and assuming that SCR1 is conducting and SCR2 is non-conducting, the inverter current flowing through resistor $R_a$ applies a positive bias to the cathode electrode of diode D1 via conventional diode CR1. Since SCR2 is non-conducting there is no such bias on the cathode of diode D2. Therefore, when the voltage across capacitor C1 reaches the firing potential, diode D2 will turn on because the anode-to-cathode voltage drop thereacross will be less than that across diode D2 by an amount equal to said bias voltage. Thereby, the potential across diode D1 never reaches the firing potential. When diode D2 turns on it causes the non-conducting portion of the inverter to also turn on and current will flow through resistor $R_b$, maintaining a positive bias on the cathode electrode of diode D2. The turning on of the previously non-conducting portion of the inverter circuit causes the previously conducting portion thereof to be turned off, thereby causing the current through resistor $R_a$ to cease flowing. From the above discussion it is seen that in this application the multivibrator acts as a free running trigger circuit for causing the inverter circuit to oscillate at the repetition rate of the trigger.

It is pointed out that the above-mentioned circuits are all illustrated using four layer diodes as the voltage sensitive switching means. It is clear that any other type of voltage sensitive switching means may be utilized in their place, as long as the basic properties thereof are maintained.

While I have described above the principles of my invention in connection with specific apparatus, it is to be clearly understood that this description is made only by way of example and not as a limitation to the scope of my invention, as set forth in the accompanying claims.

I claim:

1. A multivibrator circuit comprising:
a source of current;
first and second voltage sensitive switches coupled to said source of current, each of said switches having a cathode and an anode;
a common timing circuit coupled to said first and second switches and to said source of current;
a first output utilization means coupled to said first switch;
a second output utilization means coupled to said second switch;
a first capacitor coupled across said first switch;
a first resistor coupled to the cathode electrode of said first switch;
a second capacitor coupled to the cathode electrode of said first switch; and
the series combination of a second resistor and a first diode coupled across said second capacitor and to the first output utilization means for insuring that said second voltage sensitive switch fires after the firing of said first switch; and
a third capacitor coupled across said second switch;
a third resistor coupled to the cathode electrode of said second switch;
a fourth capacitor coupled to the cathode electrode of said second switch; and
the series combination of a fourth resistor and a second diode coupled across said fourth capacitor and to said second output utilization means to insure that said first switch fires after the firing of said second switch.

References Cited

UNITED STATES PATENTS

| | | | |
|---|---|---|---|
| 3,011,068 | 11/1961 | McVey | 307—88.5 |
| 3,041,477 | 6/1962 | Budts et al. | 307—291 |
| 3,253,234 | 5/1966 | Kretzmer | 331—113 |
| 3,297,954 | 1/1967 | Wiley | 331—113 XR |
| 3,300,655 | 1/1967 | Rosenbluth | 328—184 XR |
| 3,363,114 | 1/1968 | Fields | 328—207 XR |
| 3,054,910 | 9/1962 | Bothwell | 307—290 X |
| 3,191,060 | 6/1965 | Mahoney | 307—223 |
| 3,197,717 | 7/1965 | Redcay | 331—113 |
| 3,335,333 | 8/1967 | Myers | 328—206 |

DONALD D. FORRER, Primary Examiner

S. D. MILLER, Assistant Examiner

U.S. Cl. X.R.

307—287, 324; 331—113